March 22, 1966  H. M. L. BOSTEELS  3,242,310
WIRE-FEEDING WELDING ASSEMBLY
Filed Sept. 26, 1963  2 Sheets-Sheet 1
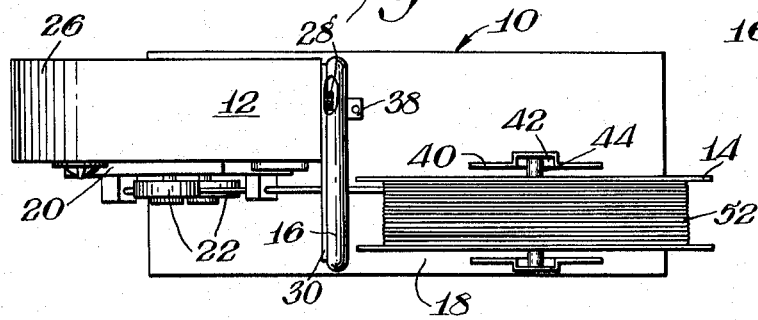
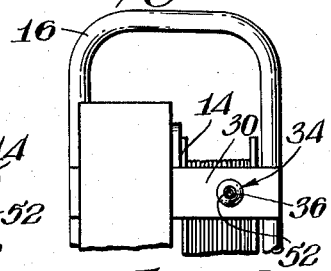
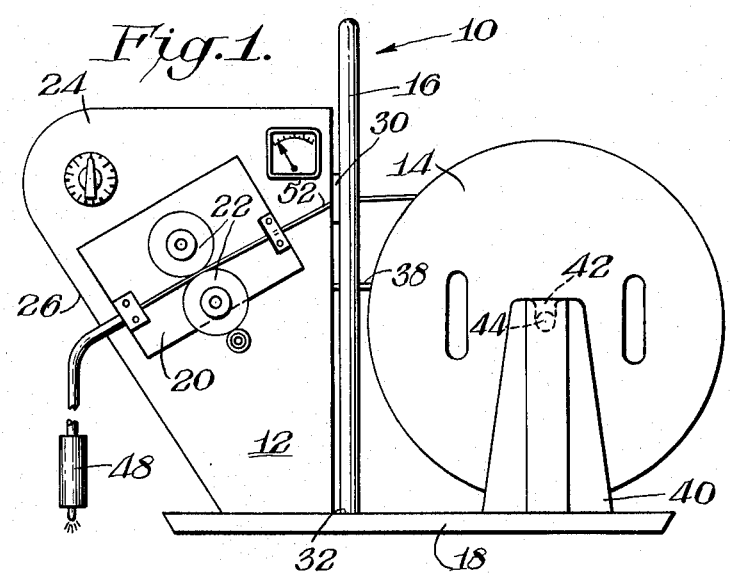
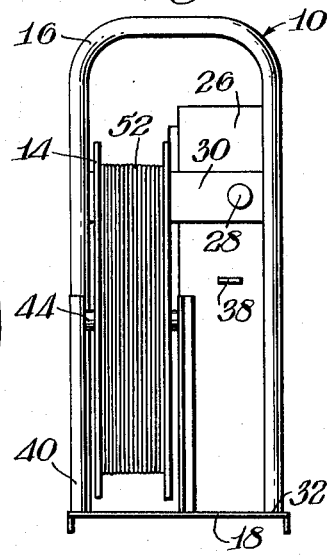
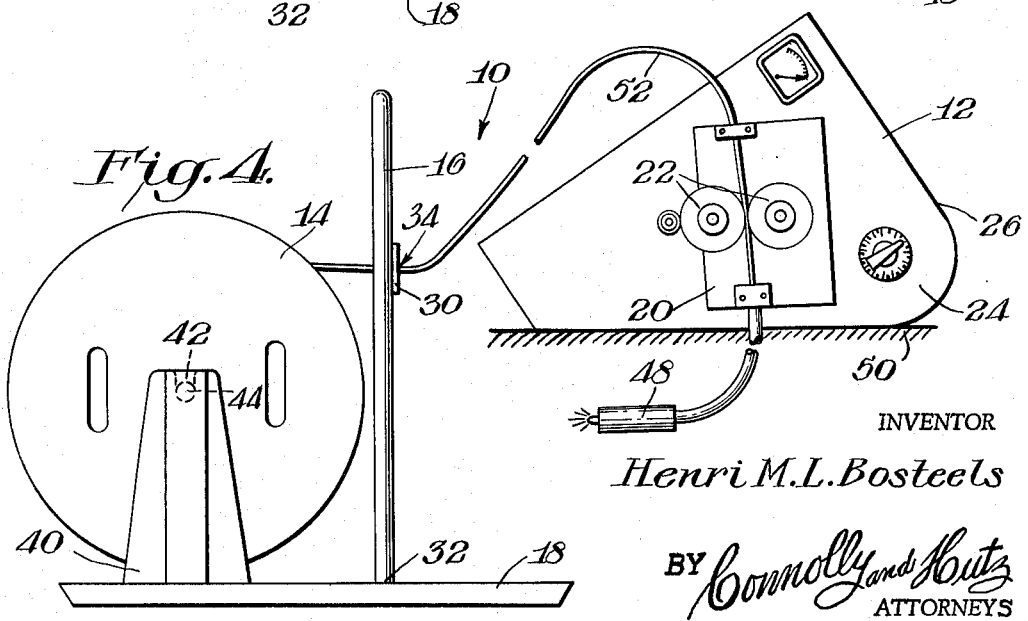
INVENTOR
Henri M.L. Bosteels
BY Connolly and Hutz
ATTORNEYS March 22, 1966 H. M. L. BOSTEELS 3,242,310
WIRE-FEEDING WELDING ASSEMBLY
Filed Sept. 26, 1963 2 Sheets-Sheet 2
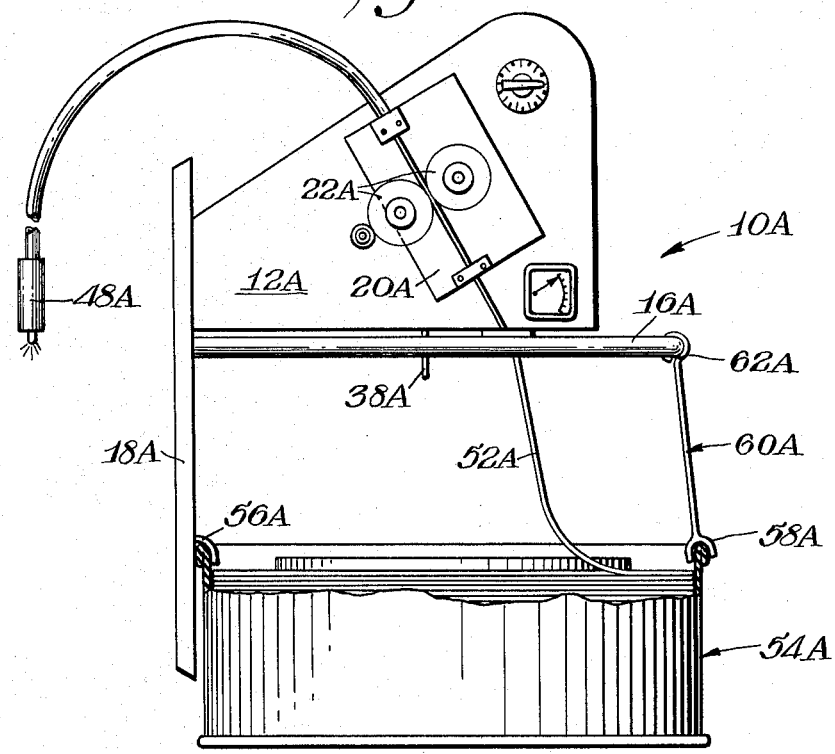
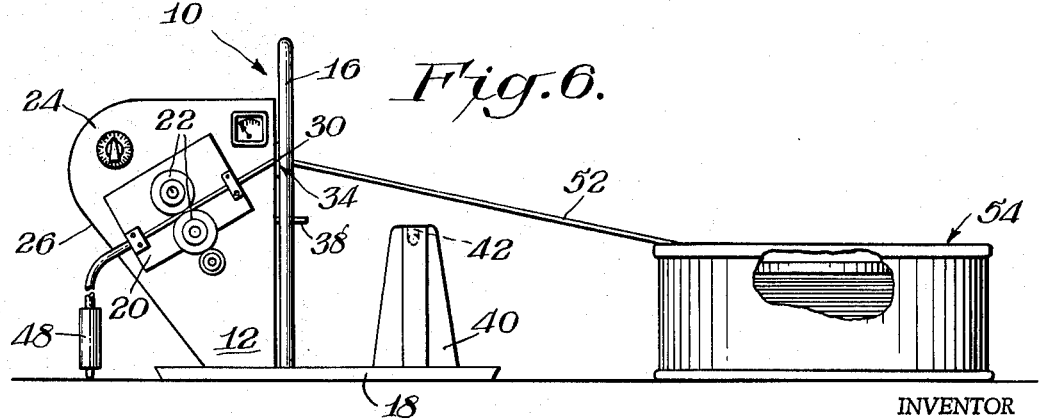
INVENTOR
Henri M.L. Bosteels

United States Patent Office 3,242,310
Patented Mar. 22, 1966

3,242,310
WIRE-FEEDING WELDING ASSEMBLY
Henri M. L. Bosteels, Lausanne, Switzerland, assignor to Central Welding Research Lab. Ltd., a corporation of Bermuda
Filed Sept. 26, 1963, Ser. No. 311,779
6 Claims. (Cl. 219—130)

This invention relates to a portable wire-feeding welding assembly, and it more particularly relates to such a welding assembly that is primarily adapted for semi-automatic operation.

A semi-automatic wire-feeding welding assembly should be as light and compact as possible to enhance its portability. However miniature versions of such devices have limited wire storage or unduly restrict the capabilities of the feeding and control assembly.

An object of this invention is to provide a simple, compact, economical and efficient assembly for a portable wire-feeding welding device.

Another object is to provide such an assembly that affords versatility and compactness without unduly restricting its wire storage and operating effectiveness.

In accordance with this invention a wire feeding and control component is secured to one side of a handle structure mounted upon a base plate, and a wire-feeding reel support is mounted on the other side of the base. The component and reel are detachably connected to the handle structure and support to permit either one or both to be conveniently removed for optimum operation under all circumstances. The wire-feeding and control device may be removed for use in restricted areas remote from the wire storage supply, and the wire reel may be removed and the supply taken directly from a larger container such as a payoff pack. The wire-feeding bearing in the handle structure helps guide the wire from the supply to the feeding and control device. The bearing and a coupling for the control and feeding device may be mounted upon a bracket plate disposed upon the upper portion of the handle structure.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention;

FIG. 2 is a side elevational view of the embodiment shown in FIG. 1;

FIG. 2A is a partial view of the side opposite to that shown in FIG. 2;

FIG. 3 is a top plan view of the embodiment shown in FIGS. 1 and 2;

FIG. 4 is a side view in elevation of the embodiment shown in FIG. 1 in a disassembled mode of operation;

FIG. 5 is a side view in elevation of another embodiment of this invention in operation from a payoff pack; and FIG. 6 is a side view of the embodiment shown in FIGS. 1 and 4 in operation from a payoff pack.

In FIGS. 1–3 is shown a semi-automatic wire-feeding welding assembly 10 including a wire-feeding and control component or device 12, and a wire reel 14 mounted upon opposite sides of a handle structure 16 secured to a substantial central area of a base 18. Device 12 is for example substantially functionally similar to that described in copending commonly assigned U.S. patent application Ser. No. 246,290, filed Dec. 13, 1962, by the same inventors and it includes a wire-feeding component 20 having a pair of wire-feeding rollers 22 and a control component 24 disposed within casing 26. Device 12 is detachably secured to assembly 10 by capscrew 28 inserted through bracket plate 30 secured upper portion of handle structure 16.

Handle structure 16 is tubular and fabricated in an inverted "U-shape" with its open ends 32 welded to base 18, which is also made of steel. A wire-feeding bearing 34 incorporating an insert 36 of a lubricating material such as nylon or Teflon is inserted within bearing 34. As shown in FIG. 2, terminal 38 extends from the side of casing 26 to provide a convenient shielded means for connecting a source of electrical power thereto.

Wire reel supports 40 are also welded to portion of base 18 remote from device 12, and a convenient detachable means for engaging reel 14 is provided by slots 42 with rounded bases 44 in the upper portions of supports 40. Axle 46 of reel 14 may accordingly be conveniently inserted and removed from slots 42. Assembly 10 may be conveniently utilized in the assembled condition by carrying it adjacent most locations and operating torch 48 therefrom.

When a fairly inaccessible location with restricted entrance openings are encountered, device 12 is removed from handle structure 16 and carried to a location such as 50 where it would be impossible or inconvenient to carry the entire assembly. The joined handle 16 and base 18 with reel 14 are then left in a more accessible place with wire 52 extending through bearing 34 for guidance into the more restricted location.

FIG. 6 shows how assembly 10 is used in conjunction with a payoff pack 54 by removing reel 14 from support 40 and connecting wire 52 from payoff pack 54 through bearing 34 to device 12.

In FIG. 5 is shown another form of this device in which reel support 40 is removed, and device 10A is mounted on and across the mouth of a payoff pack by engaging clip 56A extending from base 18A and the lower U-shaped foot 58A of leg 60A (attached to the top of handle structure 16A by loop 62A) upon opposite sides of the mouth of payoff pack 54A.

What is claimed is:

1. A wire-feeding welding assembly comprising a base plate, a handle structure mounted upon a substantially central area of said base plate and extending substantially perpendicular thereto, a wire reel support means upon said base plate on one side of said handle structure, a wire-feeding and welding control component, detachable coupling means connecting said component to the other side of said handle structure, and disengageable bearing means mounting said reel upon said reel support means whereby said component and reel may be optionally removed for convenience of operation.

2. An assembly as set forth in claim 1 wherein said handle structure is comprised of an inverted "U-shaped" tubular element having its open end attached to said base plate, bracket plate means extending across an upper portion of said handle structure, and said detachable coupling means and a wire-feeding bearing being disposed in said bracket plate means for dependably guiding wire from said reel into said assembly.

3. An assembly as set forth in claim 2 wherein said coupling mean comprises a cap screw coupling said component to said handle structure.

4. An assembly as set forth in claim 1 wherein said disengageable bearing means comprises a slotted aperture in said reel support means, and an axle shaft being disposed upon said reel for insertion into said slotted aperture.

5. An assembly as set forth in claim 1 wherein a clip is disposed upon an upper portion of said base remote from said assembly, a removable leg being movably connected to the top of said handle structure, and the foot of said leg being disposed substantially opposite said clip when said base is vertically disposed and supported across the mouth of a payoff pack with said clip and said foot of said leg hooked over opposite sides of said mouth.

6. An assembly as set forth in claim 5 wherein said reel support is removably mounted to avoid interference with said disposition of said device upon the open mouth of a payoff pack.

References Cited by the Examiner

UNITED STATES PATENTS 2,880,305 3/1959 Baird _____ 219—130
3,119,042 1/1964 Marshall _____ 314—68

FOREIGN PATENTS 218,467 11/1958 Australia.

RICHARD M. WOOD, *Primary Examiner.*